(12) United States Patent
Vasseur et al.

(10) Patent No.: US 11,388,042 B2
(45) Date of Patent: Jul. 12, 2022

(54) ANOMALY DETECTION TRIGGERED PROACTIVE REROUTING FOR SOFTWARE AS A SERVICE (SAAS) APPLICATION TRAFFIC

(71) Applicant: Cisco Technology, Inc., San Jose, CA (US)

(72) Inventors: Jean-Philippe Vasseur, Saint Martin d'uriage (FR); Grégory Mermoud, Venthône (CH); Vinay Kumar Kolar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/991,393

(22) Filed: Aug. 12, 2020

(65) Prior Publication Data
US 2022/0052905 A1  Feb. 17, 2022

(51) Int. Cl.
*H04L 43/08* (2022.01)
*H04L 41/0654* (2022.01)
*H04L 41/14* (2022.01)

(52) U.S. Cl.
CPC .......... *H04L 41/0654* (2013.01); *H04L 41/14* (2013.01); *H04L 43/08* (2013.01)

(58) Field of Classification Search
CPC ...... H04L 41/0654; H04L 41/14; H04L 43/08
See application file for complete search history.

(56) References Cited

U.S. PATENT DOCUMENTS

| | | | |
|---|---|---|---|
| 2016/0088006 A1 | 3/2016 | Gupta et al. | |
| 2016/0219070 A1* | 7/2016 | Vasseur | G06N 20/00 |
| 2018/0034685 A1 | 2/2018 | Naous | |
| 2018/0174062 A1 | 6/2018 | Simo et al. | |
| 2018/0262585 A1* | 9/2018 | Zandi | H04L 43/08 |
| 2019/0036816 A1* | 1/2019 | Evans | H04L 43/04 |
| 2019/0379589 A1 | 12/2019 | Ryan et al. | |
| 2020/0344252 A1* | 10/2020 | Menon | G06F 16/906 |
| 2020/0351237 A1* | 11/2020 | Chakkirala | G06F 16/9024 |
| 2021/0021501 A1* | 1/2021 | Hobgood | G06F 11/30 |

* cited by examiner

*Primary Examiner* — Gil H. Lee
(74) *Attorney, Agent, or Firm* — Behmke Innovation Group LLC; Kenneth J. Heywood; Jonathon P. Western

(57) ABSTRACT

In one embodiment, a device forms a telemetry cluster by applying clustering to telemetry data regarding a plurality of network connections over an access network between a plurality of entities and a remote application. The device applies anomaly detection to the telemetry cluster, to identify one or more anomalies. The device makes a determination as to whether the one or more anomalies are attributable to the remote application or to the access network. The device initiates a corrective measure, based on the determination as to whether the one or more anomalies are attributable to the remote application or to the access network.

18 Claims, 10 Drawing Sheets

ANOMALY DETECTION TRIGGERED PROACTIVE REROUTING FOR SOFTWARE AS A SERVICE (SAAS) APPLICATION TRAFFIC

TECHNICAL FIELD

The present disclosure relates generally to computer networks, and, more particularly, to anomaly detection triggered proactive routing for software as a service (SaaS) application traffic.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs.

With the emergence of technologies such as Infrastructure as a Service (IaaS) and Software as a Service (SaaS), the resulting virtualization of services has led to a dramatic shift in the traffic loads of many large enterprises. Indeed, many SaaS services can now be reached in a typical deployment via a number of different network paths. However, path selection can also greatly impact the quality of experience (QoE) associated with a given SaaS application. For instance, delays, losses, or jitter along the routing path can lower the QoE of the SaaS application.

Today, many routing decisions do not take into account the QoE associated with a given SaaS application and rely on static SLAs set for the current path and sending probes down the path to test whether it satisfies these SLAs. For instance, if the measured losses along the current path exceed an SLA threshold, the SaaS application traffic may be rerouted onto a different path. This approach, though, relies on user experience to set the SLA thresholds, which has been shown to lead to highly diverse sets of SLA thresholds for the same application. In addition, this approach is reactive in nature, meaning that the traffic will not be rerouted until the QoE of the application is potentially affected.

DESCRIPTION OF EXAMPLE EMBODIMENTS

Overview

Figure 1A:
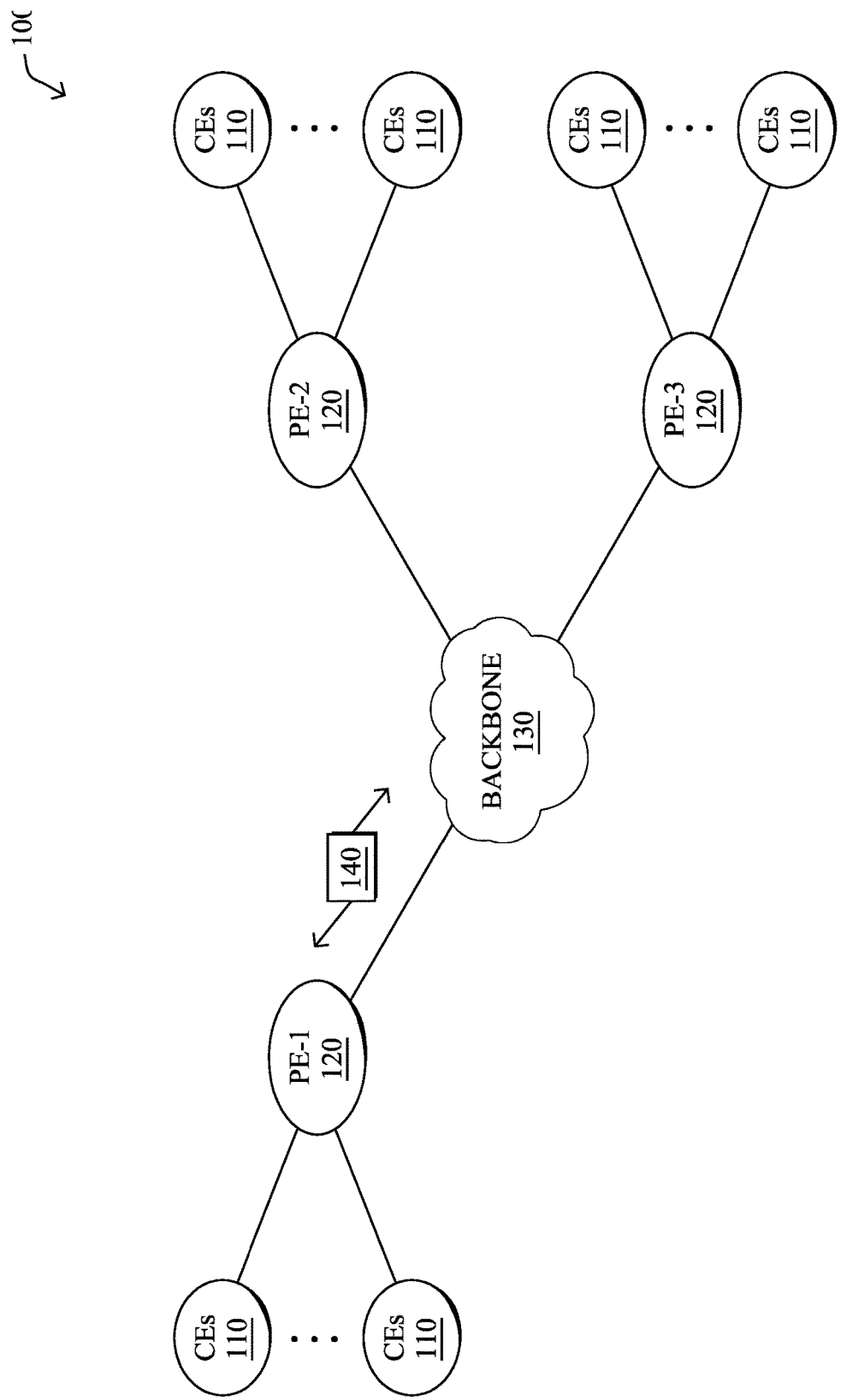
FIGS. 1A-1B illustrate an example communication network.

According to one or more embodiments of the disclosure, a device forms a telemetry cluster by applying clustering to telemetry data regarding a plurality of network connections over an access network between a plurality of entities and a remote application. The device applies anomaly detection to the telemetry cluster, to identify one or more anomalies. The device makes a determination as to whether the one or more anomalies are attributable to the remote application or to the access network. The device initiates a corrective measure, based on the determination as to whether the one or more anomalies are attributable to the remote application or to the access network.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
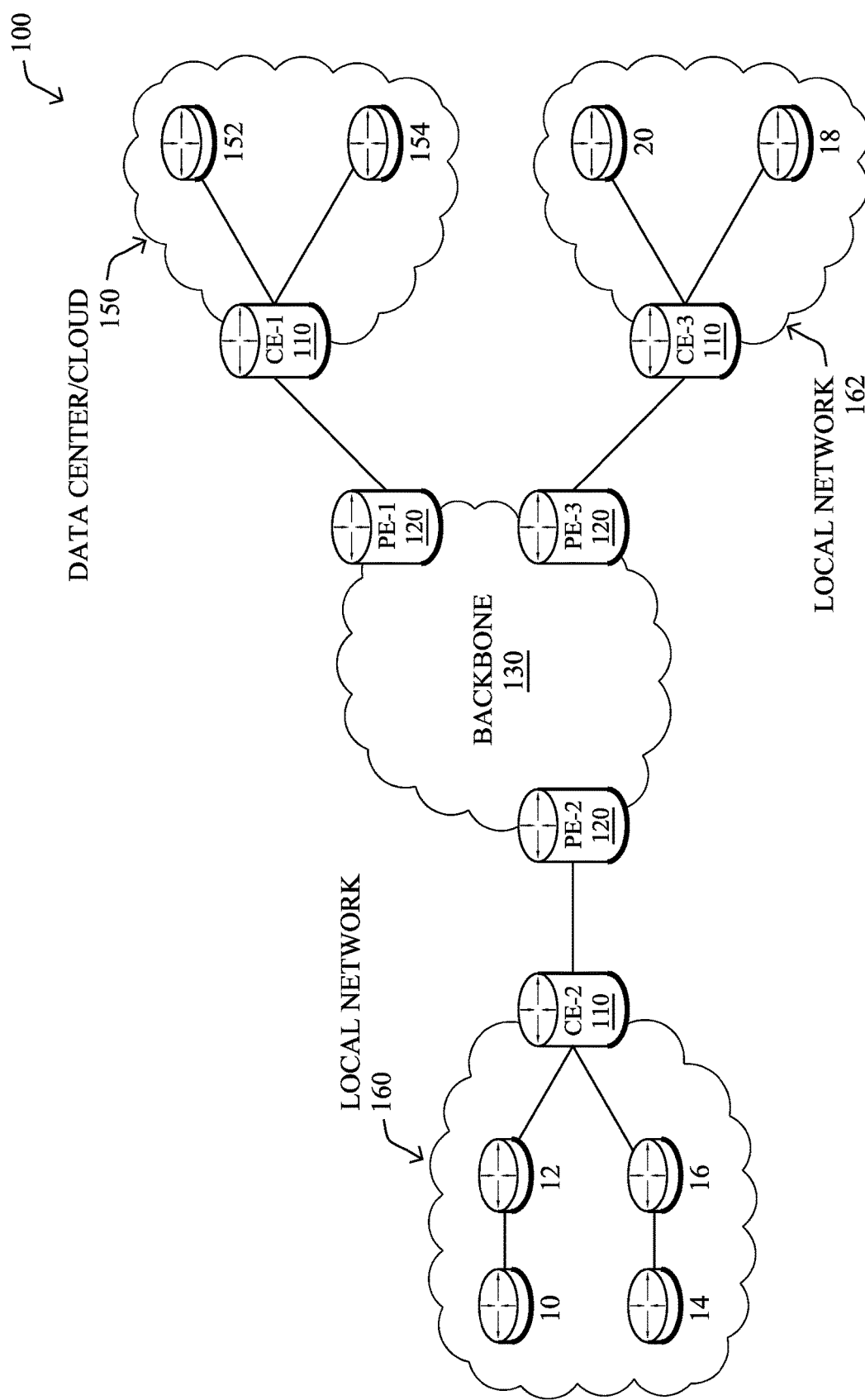

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud 150 on top of the various underlying connections. Another feature of SD-WAN is centralized management by a supervisory service that can monitor and adjust the various connections, as needed.

Figure 2:
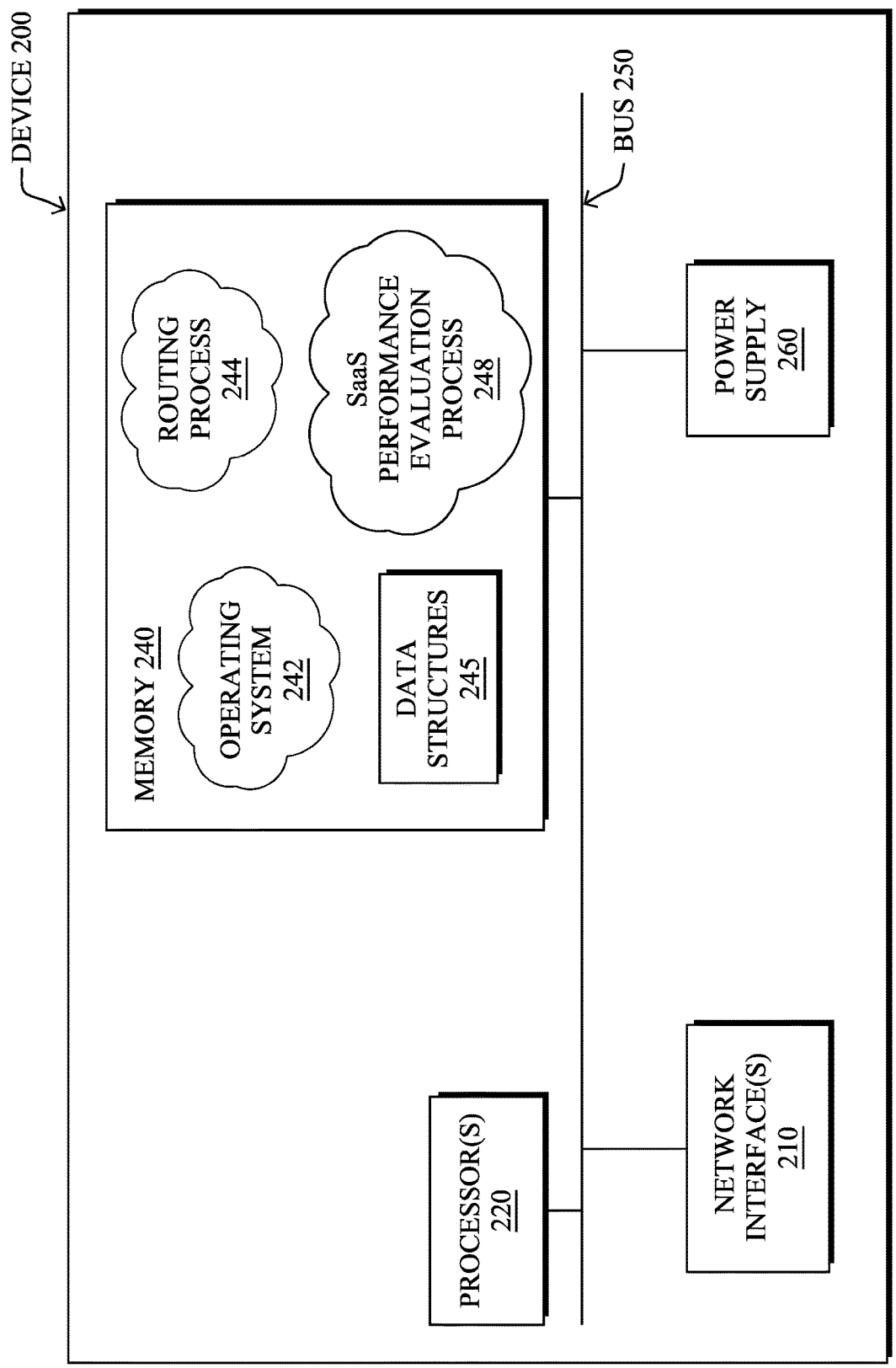
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a routing process 244 and/or a software as a service (SaaS) performance evaluation process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing process (services) 244 contains computer executable instructions executed by the processor 220 to perform functions provided by one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (i.e., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, SaaS performance evaluation process 248 may also include computer executable instructions that, when executed by processor(s) 220, cause device 200 to perform the techniques described herein. To do so, in some embodiments, SaaS performance evaluation process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, SaaS performance evaluation process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as normal or anomalous. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that SaaS performance evaluation process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted that conditions in the network will result in an unacceptable quality of experience (QoE) associated with an application. Conversely, the false negatives of the model may refer to the number of times the model incorrectly predicted an acceptable QoE. True negatives and positives may refer to the number of times the model correctly predicted whether the QoE will be acceptable or unacceptable, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different quality of service (QoS) at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
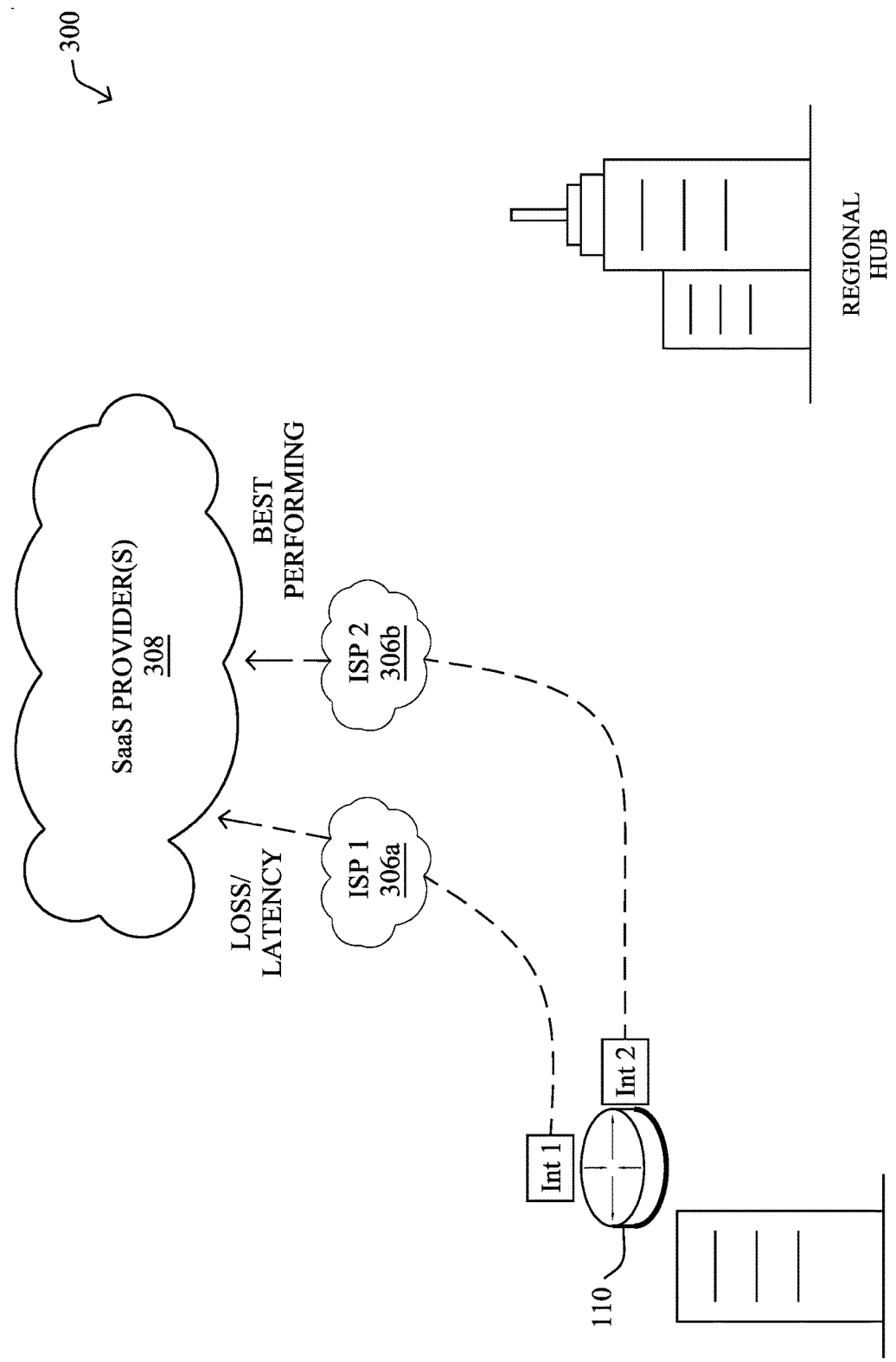
FIGS. 3A-3B illustrate example network deployments.
Figure 3B:
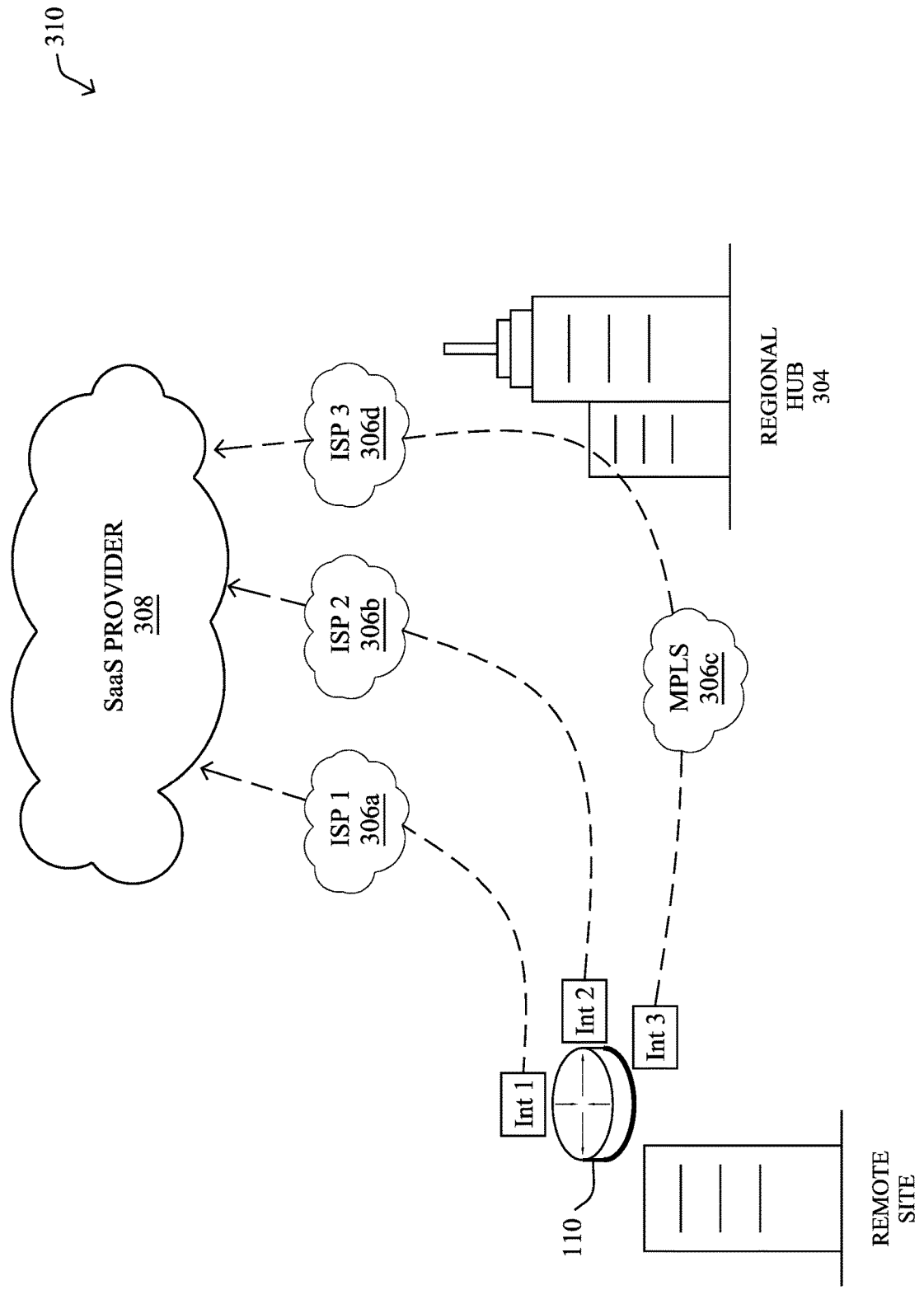

FIGS. 3A-3B illustrate example network deployments 300, 310, respectively. As shown, a router 110 (e.g., a device 200) located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
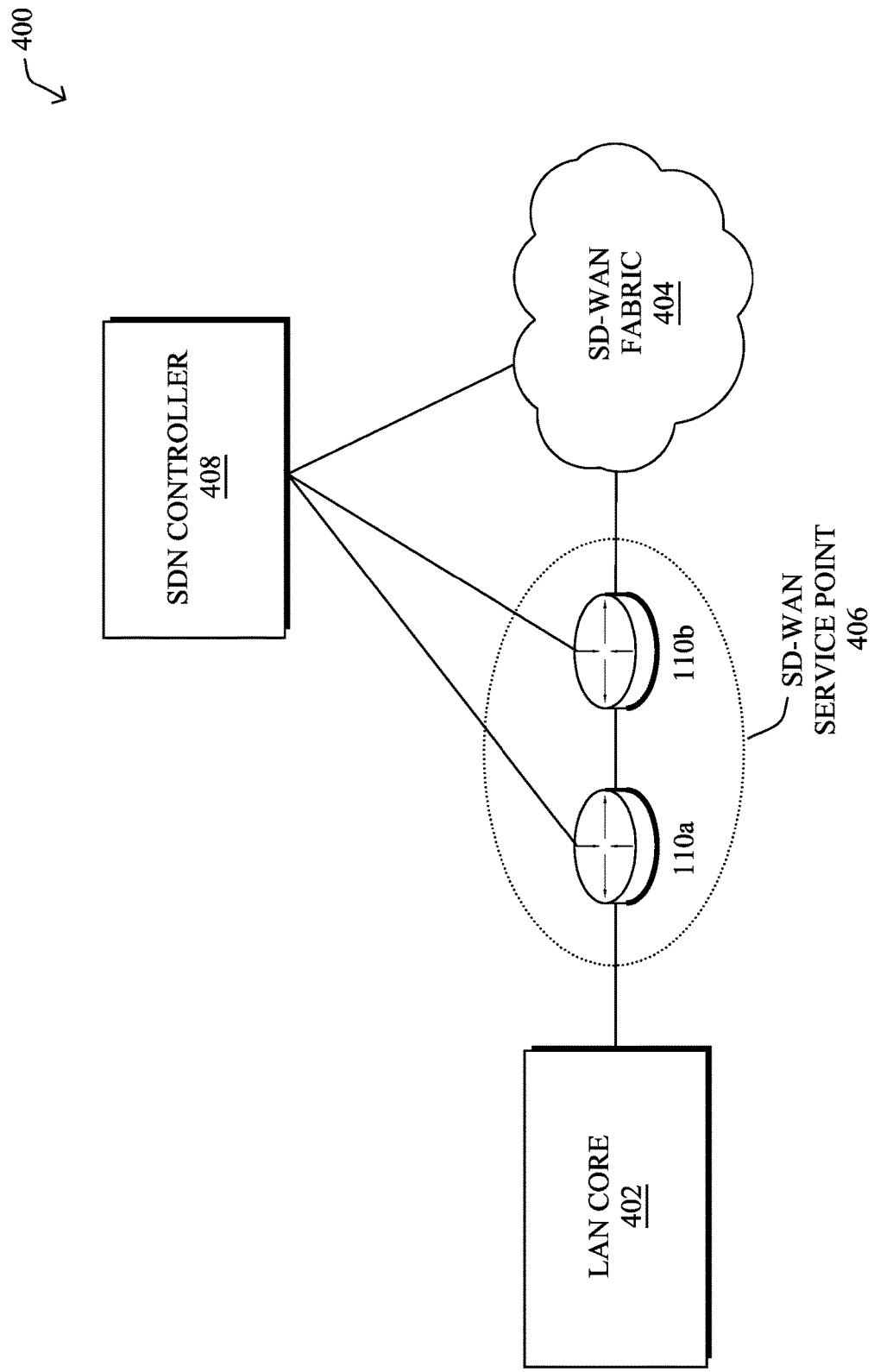
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., devices 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the QoE from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

Unfortunately, modern approaches to application aware routing make use of a deep understanding of the application requirements and of the network dynamics, with the decisions being based on instantaneous probing. This leads to sub-optimal and highly fragile solutions.

Because the two worlds of applications and networking are traditionally siloed, user complaints regarding the QoE of an application often trigger a slow and cumbersome troubleshooting workflow. The goal of this workflow is to either identify the potential root cause, and apply fixes to address the cause of the drop in QoE, or demonstrate that the issue lies in the application layer and that the network is not 'responsible' for the drop in QoE. This is often sub-optimal, manual, slow, and cumbersome.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Another limitation of existing approaches is synthetic probes are used to mimic user traffic, such as by using similar Differentiated Services Code Point (DSCP) markings as the user traffic, thus not fully reflecting the user experience. In addition, most metric-specific best path computation approaches have relied on path characteristics such as delay, loss and jitter. Indeed, such variables are relatively easy to measure using various types of probes, such as Bidirectional Forwarding Detection (BFD) probes over IPSec tunnels, 100-bytes UDP probes, HTTPS probes, etc. This still leaves a gap with respect to optimizing a path for throughput, since throughput cannot be easily evaluated via probing. One approach to doing so is to send synthetic traffic along a path, but the results are quickly outdated and never reflects the actual throughput available along the path. Sending high volumes of such traffic can also be highly disruptive to the user traffic.

Another challenge in applying SLA templates to ensure satisfactory QoE for an application is the fact that the Internet is highly dynamic, with metrics such as delay, loss, jitter, etc. varying quickly between service providers over time. In addition, SaaS workloads are also highly dynamic. This makes the task of tracking SaaS-based application anomalies extremely difficult, not only in terms of identifying network anomalies (e.g., high delay, loss, jitter, etc.), but also in identifying the root cause (e.g., the edge router, the service provider network to reach the SaaS provider, the SaaS workload being moved to a farther location, etc.).

Anomaly Detection Triggered Proactive Routing for SaaS Application Traffic

The techniques introduced herein allow for anomaly detection triggered proactive routing for SaaS application traffic. In some aspects, statistical and/or machine learning models are constructed to monitor a set of performance metrics that may impact the QoE for a given SaaS application, potentially across multiple businesses or other entities sharing similar characteristics (e.g., geographic location, etc.). In further aspects, anomaly detection may then be used to detect abnormal network characteristics that may impact the QoE. In another aspect, the techniques also allow for the identification of the root cause of any issues, be it attributable to the network itself, the local state of the route, or a shift in the SaaS workload. In yet another aspect, the techniques herein may trigger a reroute of the traffic of the application onto a secondary path with more optimal characteristics. For instance, machine learning can be used to identify when the anomalies are seasonal, in which case longer-term rerouting strategies may be used to proactively reroute the traffic along those paths.

Illustratively, the techniques described herein may be performed by hardware, software, and/or firmware, such as in accordance with the SaaS performance evaluation process 248, which may include computer executable instructions executed by the processor 220 (or independent processor of interfaces 210) to perform functions relating to the techniques described herein (e.g., in conjunction with routing process 244).

Specifically, according to various embodiments, a device forms a telemetry cluster by applying clustering to telemetry data regarding a plurality of network connections over an access network between a plurality of entities and a remote application. The device applies anomaly detection to the telemetry cluster, to identify one or more anomalies. The device makes a determination as to whether the one or more anomalies are attributable to the remote application or to the access network. The device initiates a corrective measure, based on the determination as to whether the one or more anomalies are attributable to the remote application or to the access network.

Figure 4B:
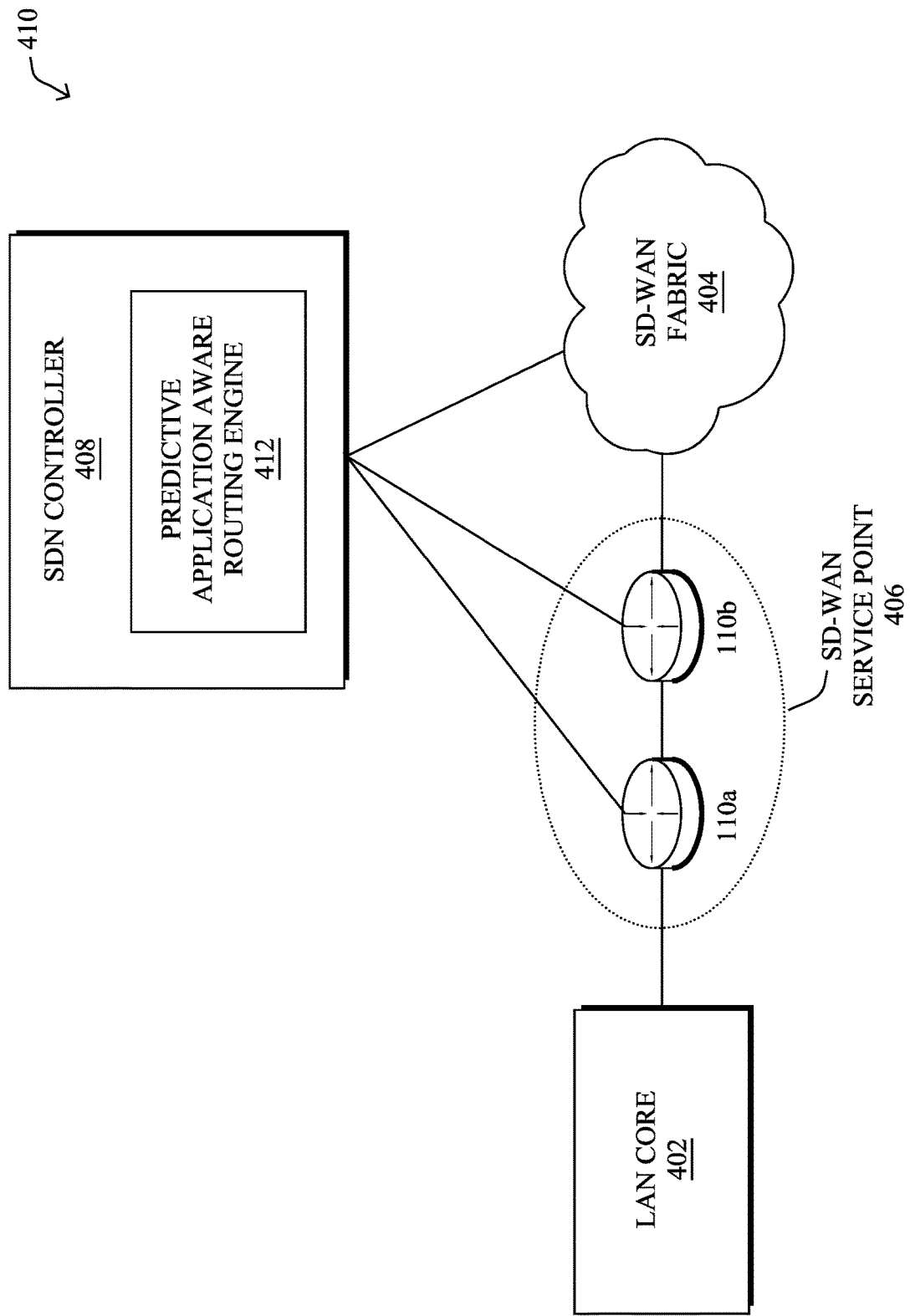

Operationally, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of process 248). Further embodiments provide for predictive application aware routing engine 412 to be hosted on a router 110 or at any other location in the network.

During execution, predictive application aware routing engine 412 makes use of high volume of network and application telemetry (e.g., from routers 110*a*-110*b*, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment.

Figure 5:
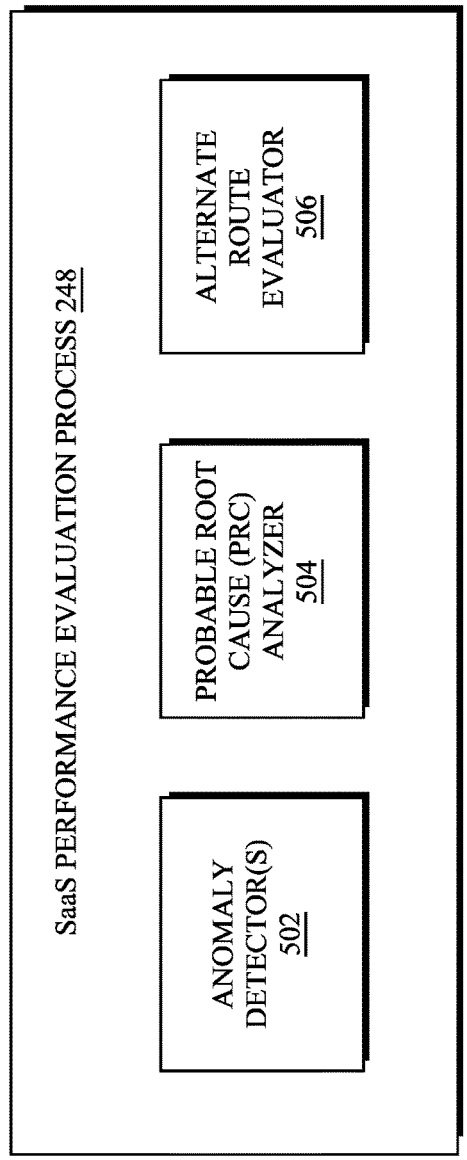
FIG. 5 illustrates an example architecture for evaluating software as a service (SaaS) performance.

FIG. 5 illustrates an example architecture 500 for evaluating SaaS performance, according to various embodiments.

As shown, SaaS performance evaluation process 248 may include any or all of the following components: one or more anomaly detectors 502, a probable root cause (PRC) analyzer, and/or an alternate route evaluator 506. As would be appreciated, the functionalities of these components may be combined or omitted, as desired. In addition, these components may be implemented on a singular device or in a distributed manner, in which case the combination of executing devices can be viewed as their own singular device for purposes of executing SaaS performance evaluation process 248.

In various embodiments, anomaly detector(s) 502 are in charge of detecting anomalies by modelling a series of networking variables related to SaaS applications. In SD-WAN networks, for instance, BFD probes (or IPSec, HTTP probes) may be used to collect delay, loss and/or latency measurements along paths of various natures, such as point of presence (PoP) to PoP (also known as P2P), via Direction Internet Access (DIA), via a central data center connected to the Internet, also referred to as backhauled traffic, etc.

To detect anomalies, anomaly detector(s) 502 may group sets of timeseries of each variable for a given application, by applying clustering to the timeseries. For instance, anomaly detector(s) 502 may cluster telemetry metrics collected across any number of different entities, such as businesses, enterprises, schools, etc. One approach to do so might be to compute clusters for a set of tunnels represented by their respective vectors having for coordinates statistical moments for delay, loss, jitter, and/or throughput. For example, anomaly detector(s) 502 may represent a path from location X to SaaS-application S and use some statistical moments such as the variance, mean, percentiles for loss and delay, to compute a vector. Then, anomaly detector(s) 502 may compute clusters of vectors across different entities or per pair of source region and SaaS application (e.g., all entities in Seattle using Microsoft Exchange Office 365). Alternatively, anomaly detector(s) 502 may use the respective time series for such statistical moments and computes clusters of time series. To this end, anomaly detector(s) 502 may employ clustering techniques such as k-means, DBSCAN, or other suitable clustering approach.

Optionally, anomaly detector(s) 502 may apply change point detection approaches in isolation, to detect a significant shift in any given network characteristic/metric. This can also be done to flag sudden changes (e.g., a large spike in delay, loss, etc.), while being highly robust of noise.

Using the clusters, anomaly detector(s) 502 may construct models of 'normal' behaviors, to detect and raise anomalies. In one embodiment, anomaly detector(s) 502 could use a simple statistical model to compute Z-scores (z), where $z=(x-\mu)/\sigma$, where $\mu$ is the mean of the population, and $\sigma$ is the standard deviation evaluated on time-window, to which a threshold T may be applied (e.g. T=3). With a normal distribution, this would correspond to the top 0.13% of the samples, although other thresholds could be used, as desired.

In further embodiments, anomaly detector(s) 502 may leverage a machine learning-based model, to detect anomalies. For example, if the data is not normally distributed, then Quantile transforms can be applied before computing the z-scores. In another example, anomaly detector(s) 502 may perform regression on the upper band of 'normal' values corresponding to some percentiles of the distribution for the network variables. In this case, the model could learn how to adjust dynamically the top n percentile (e.g., the top 1%, etc.) values using various input features such as the local states the router, time of day, amount of traffic being sent, etc. Any value exceeding the upper band of normal values computed by the machine learning algorithm, such as a Gradient Boosted Trees (GBTs), would then trigger an anomaly.

Figure 6A:
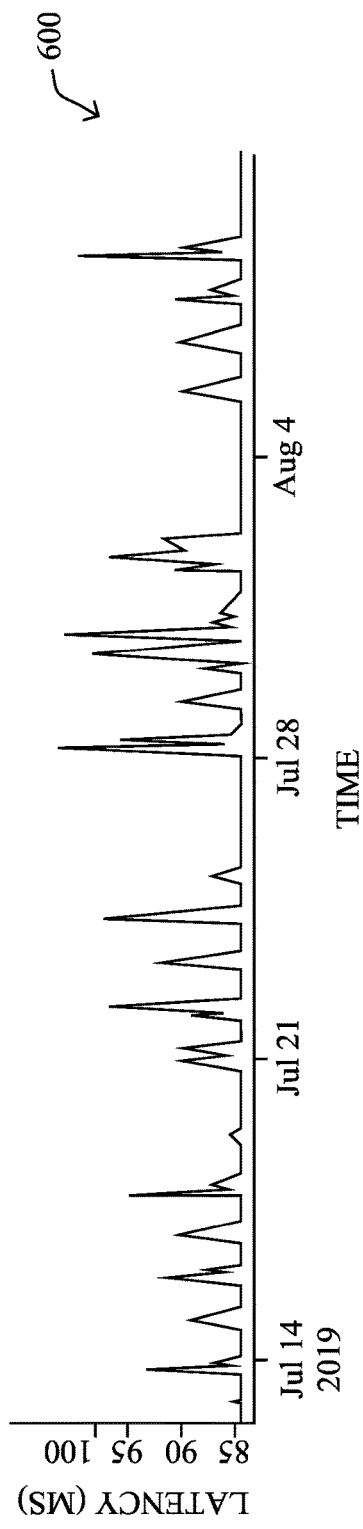
FIGS. 6A-6B illustrate example plots showing the seasonality of latency.
Figure 6B:
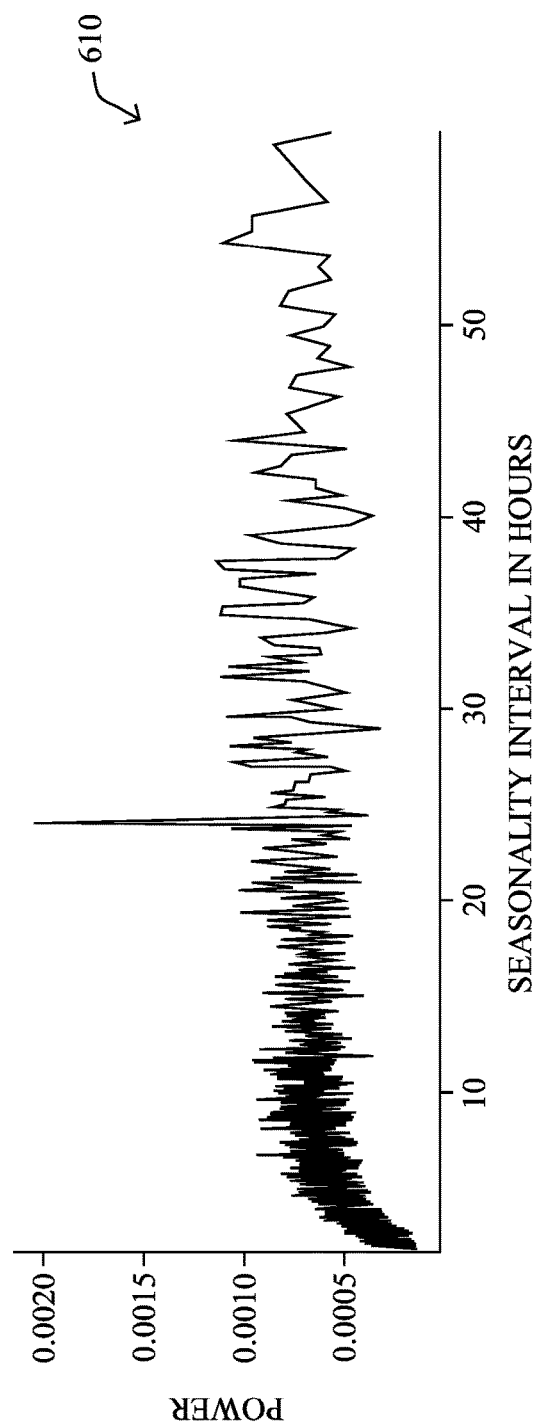

In another embodiment, anomaly detector(s) 502 may further analyze the effects of seasonality using statistical and/or machine learning approaches. For instance, anomaly detector(s) 502 may use logistic regression with exclusively time-based input features. Another alternative may be to use Fourier transform function (e.g., the Welch algorithm), to detect seasonality. For example, FIG. 6A shows an example time series 600 of measured latency over time. FIG. 6B shows the output 610 of the power spectral density functions using Fourier analysis for latency timeseries 610 for one path. More specifically, time series 600 in FIG. 6A shows the mean latency for one path and FIG. 6B illustrates the power at each time step. From FIG. 6B, it can be seen that there is a peak power at 24 hours indicating that the path is daily seasonal. In further embodiments, anomaly detector(s) 502 may use another approach to detect seasonality, such as analyzing a Partial Autocorrelation Function or the like. Note also that any seasonality detected by anomaly detector(s) 502 could also be used by alternate route evaluator 506, in some embodiments.

Through the above, anomaly detector(s) 502 may then raise abnormal event alerts for a given SaaS application, potentially localized to a given region, using a model computed for one or more entities accessing the SaaS application. For instance, such a model may be entity-specific (e.g., a particular university in a given city accessing Office 365) or may be cross-entity (e.g., all businesses and schools in the city accessing Office 365), without having to specify any hard/maximum values for a given template.

Another component of SaaS performance evaluation process 248 may be probable root cause (PRC) analyzer 504 responsible for identifying the root cause of any anomalies detected by anomaly detector(s) 502. For instance, PRC analyzer 504 may determine whether a given anomaly raised by anomaly detector(s) 502 relates to a change in the access network (to the SaaS provider), the location of the SaaS application, or other parameters.

Preliminary testing has shown there also exists some variability in the SaaS workload, which can also affect the QoE of the application. For instance, there may be a change in the server location from one city to another, causing a change in backhauling. It was also observed that certain servers exhibited seasonal changes.

Today, the edge router may perform a dynamic lookup on the DNS request, to monitor the actual IP address provided by the SaaS provider. Such address may then be reported hack to SaaS performance evaluation process 248 along with all probes values for each path that exist between the edge router and the SaaS location (e.g., via the Internet, backhauling of the traffic, etc.).

PRC analyzer 504 may then use time-based correlation to pinpoint a probable root cause, in one embodiment. For each event raised by anomaly detector(s) 502, PRC analyzer 504 may analyze several timeseries, such as any or all of the following:
Timeseries of the network characteristic that triggered the anomaly alert (e.g., delay, loss timeseries, etc.)
Timeseries of local states on the router (e.g., traffic on the interface, etc.).
Timeseries of discrete events related to location change detection of the SaaS workload.

Time-based correlation techniques are then used by PRC analyzer 504 to flag a potential root cause. For example, PRC analyzer 504 may compute the Pearson coefficient (linear relationship), with one limitation though since the variables in presence of outliers may no longer be homoscedastic. In other embodiments, PRC analyzer 504 may employ other techniques, such as Dynamic Time Wrapping, to determine such correlations.

Generally speaking, one can only infer correlation from data, which, as it is well known, is not equivalent to causation. Causation implies correlation, but not the other way around. In particular, two events A and B can be perfectly correlated without one causing the other, but because they share a common cause C. Yet, highly significant correlations may be a hint of a causal relationship, which can be assessed further by PRC analyzer 504 through the use of causal graphs designed by experts.

A causal graph represents causal chains as a directed acyclic graph whose vertices are events or conditions and edges indicate causal relationships. For instance, one may know that interface congestion can be a cause for increased delay and packet loss. Now, if the time series of queue length and delay are highly correlated for a given path, it is a strong sign that interface congestion is the root cause.

Even in absence of long-term correlations, PRC analyzer 504 may identify root causes defined in a causal graph by measuring the surprisal of a group of events. Assuming that a path has historically very small queue length and loss, but both spike at the same time (in regimes whose probability is, say, in the order of one in a million), then the surprisal of this combination is in the order of 1e-12. This is, it is very unlikely to happen by chance and one can strongly suspect that interface congestion was, indeed, the cause for the increase in loss.

Another potential component of SaaS performance evaluation process 248 is alternate route evaluator 506 that is used to analyze potential alternates that are considered as potentially 'better,' based on historical models collected across multiple entities. Once SaaS-based anomalies are raised by anomaly detector(s) 502, alternate route evaluator 506 may determine whether alternate paths may be used to improve the SaaS user experience. If so, alternate route evaluator 506 may trigger a reroute of the SaaS application traffic. In addition, PRC 504 analyzer may be used to investigate all potential actions by alternate route evaluator 506 that may lead to a QoE improvement.

To better illustrate the operation of SaaS performance evaluation process 248, the following example cases are presented:

Case 1: The root cause relates to local state (e.g., interface congestion, . . . ). This may happen between of a growth of traffic destined to the SaaS application, for instance. In this case, alternate route evaluator 506 may try to determine whether there are other paths not using this congested interface while staying within the same bound for the network characteristics used to evaluate the SaaS QoE. Said differently, alternate route evaluator 506 may determine whether there an alternate interface not congested that can be used to route the traffic to the same SaaS destination while offering similar network performance, within some margin (e.g., average not exceeding r % of the current average).

Case 2: Here, assume that the root cause of an anomaly might be the characteristics of the path used to reach the SaaS application. If the anomaly has been flagged by anomaly detector(s) 502 as seasonal, alternate route evaluator 506 may try to determine whether a better path can be selected that does not exhibit similar seasonal SLA violations. If such a path exist, alternate route evaluator 506 may trigger proactive rerouting (a new routing template is sent so as to systematically and pro-actively reroute the traffic onto a different path in order to avoid the seasonal anomaly detection). In addition, alternate route evaluator 506 may send an indication of the update to the routing policy to a user interface for review. In another embodiment, alternate route evaluator 506 may keep monitoring the status of the original path: one approach might be to shift traffic from time to time to check if the original path still suffers from seasonal SLA violation. Such an approach may be used if alternate route evaluator 506 determines that the new alternate path has lower performance than the original path before the rise of seasonal SLA violation.

Case 3: Assume here that the SaaS workload shift can easily be determined thanks to DNS resolution. If the workload shift impacts all of its accessing entities a region, no anomaly may be raised by anomaly detector(s) 502 because they are equally affected. However, change point detection can still be used to identify and report on the situation. In this instance, alternate route evaluator 506 may still try to find an alternate path improving the QoE for the given application using a similar approach as in the second case above, while reporting to the user interface that the change of routing strategy is due to the workload shift in the SaaS, as well as potent crating that such an issue is also observed for other entities in the same region.

Figure 7:
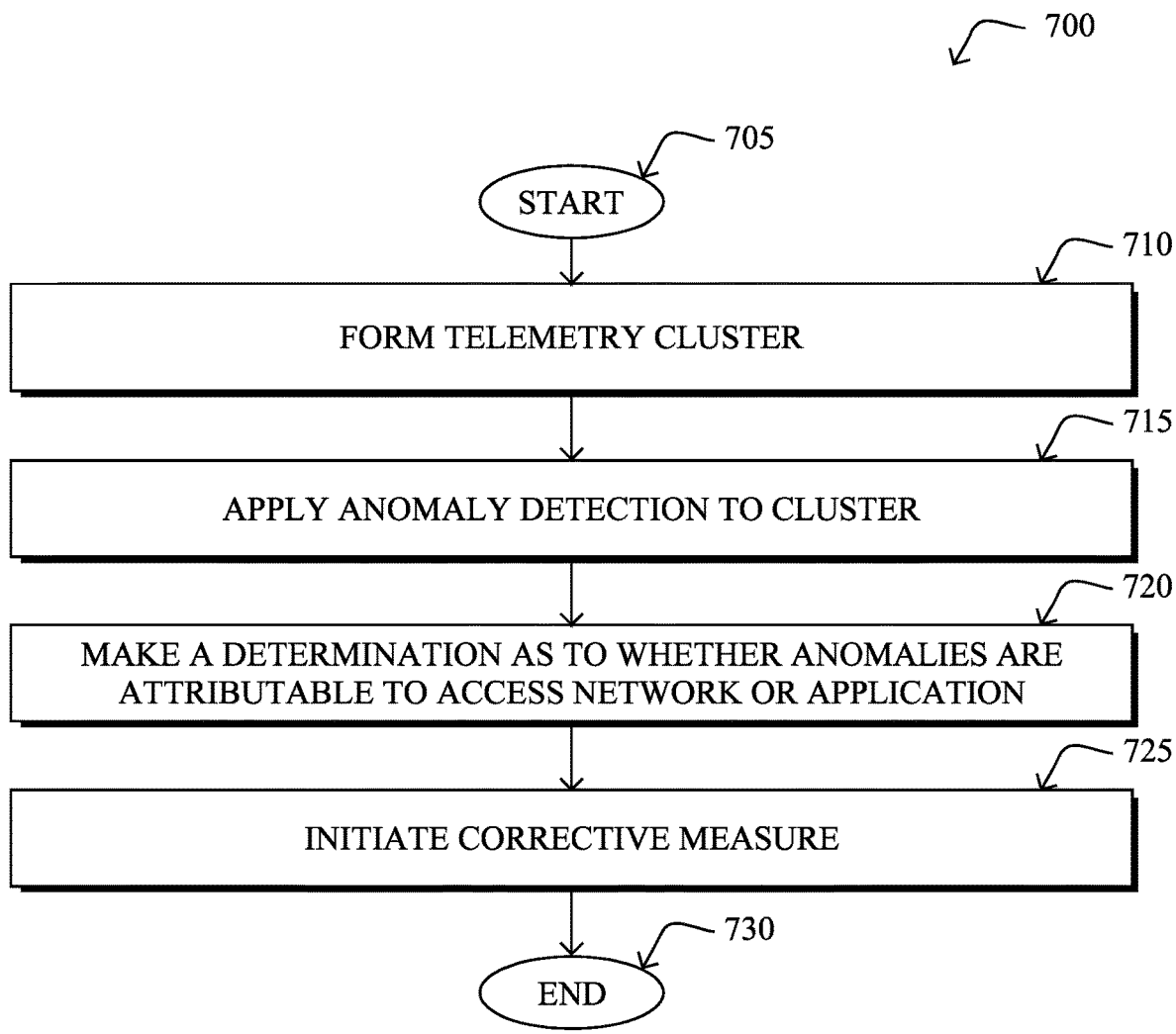
FIG. 7 illustrates an example simplified procedure to evaluate application traffic in a network.

FIG. 7 illustrates an example simplified procedure to evaluate application traffic in a network, in accordance with one or more embodiments described herein. For example, a non-generic, specifically configured device (e.g., device 200), such as a controller supervising a plurality of routers, a router, etc., may perform procedure 700 by executing stored instructions (e.g., process 248). The procedure 700 may start at step 705, and continues to step 710, where, as described in greater detail above, the device may form a telemetry cluster by applying clustering to telemetry data regarding a plurality of network connections over an access network between a plurality of entities and a remote application, such as an SaaS application. In some embodiments, the device may select the plurality of entities (e.g., schools, businesses, etc.) based on them being located in a particular geographic location (e.g., city, state, etc.). In various embodiments, the telemetry data may be indicative of one or more of: jitter, loss, or delays associated with the network connections. For instance, the telemetry data may comprise time series of performance metrics collected from the various paths used by the plurality of entities to the application.

At step 715, as detailed above, the device may apply anomaly detection to the telemetry cluster, to identify one or more anomalies. In various embodiments, the device may do so by applying change point detection to the telemetry cluster. In further embodiments, the device may do so by applying a statistical model or machine learning-based model to the telemetry data. In further embodiments, the device may also determine whether the one or more anomalies are seasonal.

At step 720, the device may make a determination as to whether the one or more anomalies are attributable to the remote application or to the access network, as described in greater detail above. In some embodiments, the device may do so by determining a temporal correlation between the one or more anomalies and changes to network destinations associated with the remote application. For instance, the device may identify the changes to the network destinations associated with the remote application using DNS resolution data. In a further embodiment, the device may make the determination by generating a causal graph based in part on the one or more anomalies and analyzing the causal graph.

Depending on the determination, the device may initiate a corrective measure such as moving traffic in the access network to different network paths that do not exhibit seasonal anomalies similar to those of the one or more anomalies. Procedure 700 then ends at step 725.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for proactively rerouting traffic associated with an SaaS application, by comparing network performance metrics across different entities. In some aspects, the techniques herein further allow for the root causing of the anomalies, such as due to the network itself or changes to the SaaS application.

While there have been shown and described illustrative embodiments that provide for proactively rerouting SaaS application traffic, it is to be understood that various other adaptations and modifications may be made within the spirit and scope of the embodiments herein. For example, while certain embodiments are described herein with respect to using certain models for purposes of anomaly detection and root causing issues, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   forming, by a device, a telemetry cluster by applying clustering to telemetry data regarding a plurality of network connections over an access network between a plurality of entities and a remote application;
   applying, by the device, anomaly detection to the telemetry cluster, to identify one or more anomalies;
   making, by the device, a determination as to whether the one or more anomalies are attributable to the remote application or to the access network by determining a temporal correlation between the one or more anomalies and changes to network destinations associated with the remote application; and
   initiating, by the device, a corrective measure, based on the determination as to whether the one or more anomalies are attributable to the remote application or to the access network.

2. The method as in claim 1, wherein forming the telemetry cluster comprises:
   selecting the plurality of entities based on the plurality of entities being located in a particular geographic location.

3. The method as in claim 1, wherein the telemetry data is indicative of one or more of: jitter, loss, or delays.

4. The method as in claim 1, wherein the device comprises a controller for a plurality of routers.

5. The method as in claim 1, further comprising:
   identifying the changes to the network destinations associated with the remote application using Domain Name System (DNS) resolution data.

6. The method as in claim 1, wherein making the determination as to whether the one or more anomalies are attributable to the remote application or to the access network comprises:
   generating a causal graph based in part on the one or more anomalies; and
   analyzing the causal graph, to make the determination.

7. The method as in claim 1, further comprising:
   determining whether the one or more anomalies are seasonal.

8. The method as in claim 7, wherein, when the one or more anomalies are determined to be seasonal, the corrective measure comprises moving traffic in the access network to different network paths that do not exhibit characteristics of the one or more anomalies.

9. The method as in claim 1, wherein the remote application is a software as a service (SaaS) application.

10. An apparatus, comprising:
    one or more network interfaces;
    a processor coupled to the one or more network interfaces and configured to execute one or more processes; and
    a memory configured to store a process that is executable by the processor, the process when executed configured to:
      form a telemetry cluster by applying clustering to telemetry data regarding a plurality of network connections over an access network between a plurality of entities and remote application;
      apply anomaly detection to the telemetry cluster, to identify one or more anomalies;
      make a determination as to whether the one or more anomalies are attributable to the remote application or to the access network by determining a temporal correlation between the one or more anomalies and changes to network destinations associated with the remote application; and
      initiate a corrective measure, based on the determination as to whether the one or more anomalies are attributable to the remote application or to the access network.

11. The apparatus as in claim 10, wherein the apparatus forms the telemetry cluster by:
    selecting the plurality of entities based on the plurality of entities being located in a particular geographic location.

12. The apparatus as in claim 10, wherein the telemetry data is indicative of one or more of: jitter, loss, or delays.

13. The apparatus as in claim 10, wherein the process when executed is further configured to:
    identify the changes to the network destinations associated with the remote application using Domain Name System (DNS) resolution data.

14. The apparatus as in claim 10, wherein the apparatus makes the determination as to whether the one or more anomalies are attributable to the remote application or to the access network by:

generating a causal graph based in part on the one or more anomalies; and analyzing the causal graph, to make the determination.

15. The apparatus as in claim 10, wherein the process when executed is further configured to:

determine whether the one or more anomalies are seasonal.

16. The apparatus as in claim 15, wherein, when the one or more anomalies are determined to be seasonal, the corrective measure comprises moving traffic in the access network to different network paths that do not exhibit characteristics of the one or more anomalies.

17. The apparatus as in claim 10, wherein the remote application is a software as a service (SaaS) application.

18. A tangible, non-transitory, computer-readable medium storing program instructions that cause a device to execute a process comprising:

forming, by the device, a telemetry cluster by applying clustering to telemetry data regarding a plurality of network connections over an access network between a plurality of entities and a remote application;

applying, by the device, anomaly detection to the telemetry cluster, to identify one or more anomalies;

making, by the device, a determination as to whether the one or more anomalies are attributable to the remote application or to the access network by determining a temporal correlation between the one or more anomalies and changes to network destinations associated with the remote application; and initiating, by the device, a corrective measure, based on the determination as to whether the one or more anomalies are attributable to the remote application or to the access network.

* * * * *

UNITED STATES PATENT AND TRADEMARK OFFICE
CERTIFICATE OF CORRECTION

PATENT NO. : 11,388,042 B2
APPLICATION NO. : 16/991393
DATED : July 12, 2022
INVENTOR(S) : Jean-Philippe Vasseur It is certified that error appears in the above-identified patent and that said Letters Patent is hereby corrected as shown below:

In the Specification

Column 10, Line 49, please amend as shown:
engine 412 makes use of a high volume of network and Column 12, Line 50, please amend as shown:
back to SaaS performance evaluation process 248 along with Column 14, Line 24, please amend as shown:
SaaS, as well as potentially indicating that such an issue is also Signed and Sealed this
Eighteenth Day of October, 2022

Katherine Kelly Vidal
*Director of the United States Patent and Trademark Office*